United States Patent [19]

Anderson

[11] Patent Number: 4,674,184

[45] Date of Patent: Jun. 23, 1987

[54] CUTTING TOOL FOR SYNTHETIC RESIN TUBES

[75] Inventor: J. Edward C. Anderson, Moreland Hills, Ohio

[73] Assignee: Milbar Corporation, Chagrin Falls, Ohio

[21] Appl. No.: 839,650

[22] Filed: Mar. 13, 1986

[51] Int. Cl.⁴ .......................... B23D 21/06; B26D 3/16
[52] U.S. Cl. ........................................... 30/92; 30/251
[58] Field of Search .................... 30/92, 251, 252, 192

[56] References Cited

U.S. PATENT DOCUMENTS

| | | | |
|---|---|---|---|
| Re. 30,613 | 5/1981 | Nakamura et al. | 30/94 |
| 3,273,240 | 9/1966 | Florian | 30/251 |
| 3,390,455 | 7/1968 | Florian | 30/251 |
| 4,084,317 | 4/1978 | Nakamura | 30/251 |
| 4,094,064 | 6/1978 | Nishikawa et al. | 30/92 |
| 4,176,450 | 12/1979 | Muromoto | 30/92 |
| 4,186,484 | 2/1980 | Tanaka | 30/92 |
| 4,312,127 | 1/1982 | Tanaka | 30/92 |
| 4,368,577 | 1/1983 | Babb | 30/92 |
| 4,378,636 | 4/1983 | Wick | 30/92 |

Primary Examiner—Jimmy C. Peters
Attorney, Agent, or Firm—Watts, Hoffmann, Fisher & Heinke Co.

[57] ABSTRACT

A cutting tool for plastic tubes or the like including a pair of pivotally connected handle members. One member is defined by a pair of sidewalls interconnected by spaced web portions, an integrally formed jaw for supporting a tube to be cut, pivot structure for pivotally supporting a cutting blade and a slot through which the cutting blade extends. The second handle member carries a ratchet plate having a aperture defining a plurality of ratchet teeth. The ratchet plate is secured to the second handle member by the co-engagement between a pivot pin and an aperture formed in the ratchet plate and a mounting edge that abutably engages an abutment wall formed by the second handle member. The cutting blade is mounted to the first member by a pivot assembly which is easily removed to release the blade. In addition, the pivot assembly is operative to apply a clamping force between the handle member and the cutting blade to produce a drag on the blade so that it remains stationary when the handle members are released. A reset linkage acting between the second handle member and a ratchet lever is operative to release the ratchet mechanism whenever the handle members are spread apart so that a ratchet pawl is permitted to move to its starting position at the commencement of a cutting cycle. The cutting blade is easily removed from the cutting tool by removing the pivot assembly and by releasing the engagement between the ratchet mechanism and the cutting blade. An easily removable pin including a spring ring connects the ratchet mechanism with the cutting blade.

18 Claims, 5 Drawing Figures

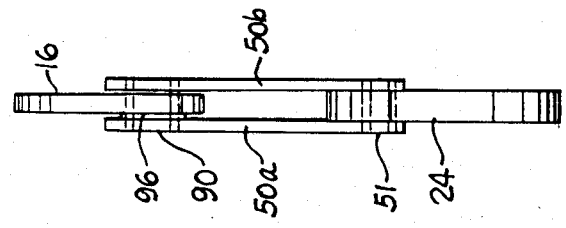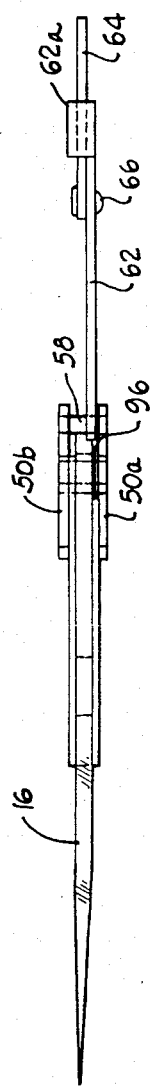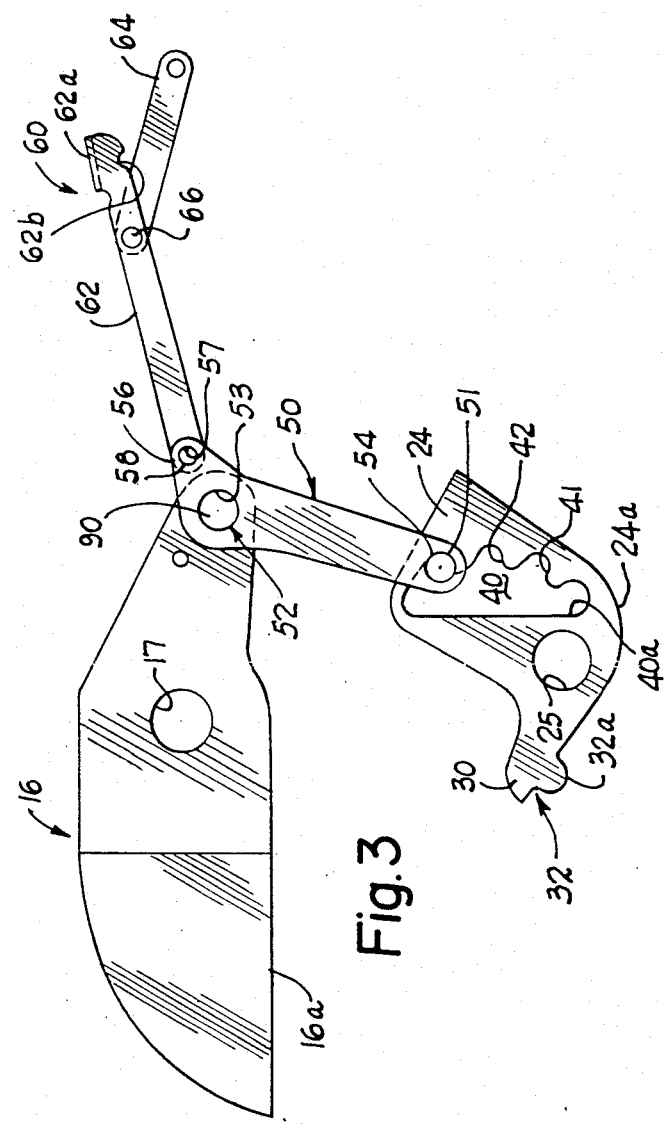

CUTTING TOOL FOR SYNTHETIC RESIN TUBES

DESCRIPTION

1. Technical Field

The present invention relates generally to cutting tools and in particular to a tool adapted for cutting synthetic resin tubes.

2. Background Art

Synthetic resin tubes and conduits such as PVC pipes are enjoying a widespread use in both the plumbing and electrical industry. Synthetic tubes are being used in many plumbing applications to replace copper piping. In electrical applications, synthetic tubes are being used as conduits for enclosing and protecting individual wires.

Various methods for cutting the tubes to a given length have been suggested by the prior art. When first introduced, the tubes typically were cut by a hand or motorized saw. This was followed by cutting tools specifically tailored to cut synthetic tubes. One such cutting tool comprises a movable jaw and blade actuated by a pair of operating handles. Squeezing the handles causes the blade to move towards the jaw. A tube placed between the blade and the jaw would thus be cut when the handles were squeezed. In tools in which a single squeezing of the handles produced full cutting motion in the blade, excessive hand force would be required especially when cutting heavy gauge or large diameter tubes. For some of these tools, both hands were needed to apply the requisite operating force.

Ratcheting type cutters have been suggested in an attempt to reduce the hand force required. With this type of tool, squeezing the handles produces only a partial cutting movement in the blade. Multiple actuations or handle squeezes are needed in order to move the blade from a fully open to a fully closed position. The purpose of these constructions was to increase the mechanical advantage of the handle motioned in order to amplify the hand force at the cutting blade.

It has been found that the blade force needed to effect cutting of the tube varies depending on the position of the blade in the tube during a cutting procedure. It is believed that at least in some prior art cutting tools, sufficient mechanical advantage is not provided at the blade positions requiring the greatest cutting force. As a result, for some of these tools, excessive hand force is required at certain points in the cutting blade movement.

At least one cutting tool has been suggested in which a constant mechanical advantage has been provided for all blade positions. This arrangement requires a rather complex tool and would appear to be superfluous since it has been found that the force needed to move the blade varies substantially depending on the position of the blade in the tube.

It should also be apparent that the cutting edge of the blade gradually becomes dull through use. Periodic sharpening and/or replacement is required. Since sharpening a cutting blade is a skill in itself, the average user, not having this skill, would prefer blade replacement over sharpening. In many, if not most, of the prior art cutters, it is difficult for the user to remove and replace the blade. Moreover, in some of these tools the blade itself includes structure defining a portion of the ratcheting mechanism such as ratchet teeth. With these constructions, the blade itself is an expensive component of the system making replacement prohibitively costly.

DISCLOSURE OF INVENTION

The present invention provides a new and improved cutting tool for shearing synthetic resin tubes such as plastic conduits.

The tool comprises a first handle member defining a fixed jaw by which a tube to be cut is at least partially supported and a second handle member pivotally connected to the first member. A cutting blade including a cutting edge movable towards and away from the fixed jaw, is pivotally supported by the first handle member. A ratchet lever is operatively connected to the blade at one end while the other end includes a ratchet pawl engaged by a ratchet plate mounted in the second handle member. The ratchet plate includes a slot-like recess defining a plurality of ratchet teeth along one edge. A biasing spring acting between the cutting blade and the ratchet lever urges the pawl towards the edge of the ratchet plate or the ratchet slot that defines the ratchet teeth.

In accordance with the invention, the ratchet teeth and ratchet lever are sized and located such that sufficient mechanical advantage is obtained during cutting blade travel such that at those positions of the cutting blade which require the maximum cutting force, excessive hand force in not required of the user in order to operate the tool. In particular, in the disclosed and exemplary embodiment, the hand force needed to shear a one inch soft PVC plastic tube having a wall thickness of about 5/32" does not exceed 50 lbs. at any point in the cutting blade travel.

It has been found that high blade forces are encountered at the beginning of the cutting cycle as the blade cuts through the wall of the tube and near the end of the cutting cycle as the blade again cuts through the tube wall. In the disclosed embodiment, the ratchet teeth and ratchet lever are arranged such that the mechanical advantage obtained at any given ratchet tooth location increases as the handles are squeezed. In addition, the ratchet teeth and lever are sized and located such that the operating handles are partially squeezed as opposed to fully spread apart position, when the blade is at a point in travel at which high blade forces are required. As a result, sufficient mechanical advantage is provided to the operator so that excessive input forces not required in order to actuate the cutting blade at the points in travel at which high forces are generated. Unlike some of the prior art tools, the mechanical advantage changes as the handles are squeezed and as the ratchet lever indexes along the ratchet teeth. High mechanical advantages are provide at those blade positions requiring a high blade force.

In accord with a feature of the invention, the ratchet plate, mounted to the second handle member includes a peripheral edge that closely conforms to a wall forming part of the second handle member. The close conformity of the edge with the wall in cooperation with a pivot pin that extends through the handle members and the ratchet plate provides a rigid mounting of the ratchet plate to the second handle member obviating the need for separate fasteners or bonding elements.

According to another feature of the invention, a reset linkage extends between the ratchet lever and the second handle member. When the handle members are pulled apart to their extreme open positions the linkage which includes first and second links, operates to counteract the normal biasing of the ratchet lever towards the ratchet teeth. By counteracting the normal biasing, the ratchet pawl is urged away from the ratchet teeth. The pawl disengages itself from the ratchet teeth and travels to an initial position in the ratchet plate slot thereby allowing the blade to move to its fully opened position at the start of a cutting procedure. In accordance with this feature, one of the links of the reset linkage includes an extension that is engageable with a handle locking mechanism forming part of the second handle member. This feature enables the handle members to be brought together and locked in the fully squeezed position when the tool is not being used.

In accordance with another feature of the invention, the handle members are molded from a glass reinforced synthetic material, resulting in a relatively inexpensive tool construction. As indicated above, the mounting of the ratchet plate is simplified by contouring a peripheral edge of the plate to conform to a wall defined by the second handle member. This mounting wall is easily formed during the molding process. In addition, recesses are integrally molded in the handle to accommodate movement of components during use such as the ratchet lever biasing spring. The handles are normally biased apart by a coil spring captured between the first handle member and the ratchet plate which includes an integrally formed spring seat.

In accordance with still another feature of the invention, the cutting blade is relatively easily replaced. Unlike the prior art, the cutting blade, although driven by the ratchet lever, does not in itself include ratchet teeth or other structural elements forming integral parts of the ratcheting mechanism. Replacement of the blade is achieved by simply removing the pivot support for the blade and a pivot pin that interconnects the ratchet lever with the blade. Both procedures are easily done by the user.

Additional features of the invention will become apparent and a fuller understanding obtained by reading the following detailed description made in connection with the accompanying drawings.

BRIEF DESCRIPTION OF DRAWINGS

FIG. 3 is a side elevational view showing the various linkages forming part of the cutter shown in FIG. 1;

FIG. 4 is a top view of the linkage shown in FIG. 3; and

FIG. 5 is an end view of the linkage shown in FIG. 3.

BEST MODE FOR CARRYING OUT THE INVENTION

Figures 1, 2:
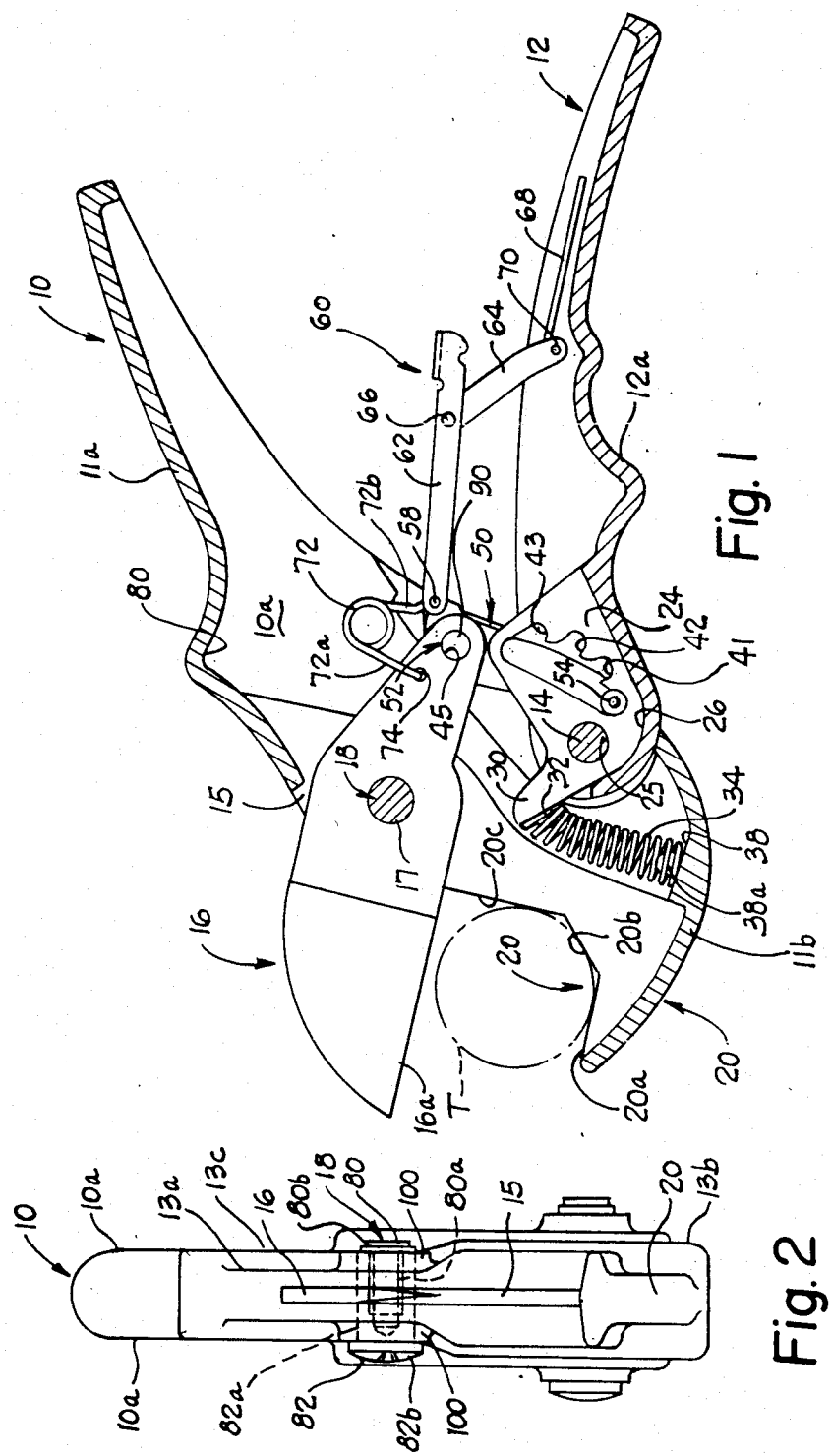
FIG. 1 is a sectional view of a synthetic tube cutter constructed in accordance with the preferred embodiment of the invention.
FIG. 2 is an end view of the cutter shown in FIG. 1.

FIG. 1 illustrates the overall construction of an apparatus for cutting the synthetic resin tubes, embodying the present invention. The tool includes a pair of operating handles 10, 12 pivotally interconnected by a pivot pin 14.

The upper handle member 10 is preferably molded and includes an integrally formed jaw 20. More specifically the handle member 10 is defined by a pair of parallel sidewall portions 10a (only one is shown in FIG. 1) that extend between and are spaced apart by integrally formed upper and lower interconnecting webs 11a, 11b.

As seen in FIG. 2, the exterior of the sidewalls 10a are not uniform and each includes a narrow dimension section 13a, an enlarged section 13b and an intermediate section 13c. These sections define internal recesses that vary in accordance with the variation in the external dimension. As seen best in FIG. 2, the narrow section 13a and the jaw 20 define a slot 15. The upper handle member pivotally mounts a cutting blade 16, the left end of which (as viewed in FIG. 1) extends through the slot 15. A pivot assembly 18, to be described, extends through an aperture 17 formed in each sidewall 10a and pivotally supports the blade for movement towards and away from the jaw 20. The jaw 20 includes inclined, rectilinear jaw surfaces 20a, 20b, and 20c adapted to support a variety of tubes or other articles to be cut. It should be noted, that the interconnected inclined surfaces 20a, 20b, 20c center a circular tube T so that the axis of the tube, regardless of size, is in approximately the same location relative to the transverse dimension of the surface 20b during the cutting process.

The handle member 12 is similarly constructed and includes sidewalls 12a interconnected by web 12b which also defines a finger grip. The transverse dimension (as viewed in FIG. 2) of the handle member 12 is selected to fit within the recess defined between the enlarged sidewall portion 13b.

The lower handle 12 mounts a ratchet plate 24 between the sidewalls 12a. According to a feature of the invention, the lower handle 12 defines an arcuate abutment wall 26 which closely conforms to a lower edge 24a (shown in FIG. 3) of the ratchet plate 24. With this construction, the ratchet plate 24 is rigidly held by the lower handle member 12 by the combination of the arcuate wall segment 26 and the pivot pin 14. The pivot pin 14 extends through an aperture 25 formed in the ratchet plate 24. Supplemental fasteners or bonding are not required to mount the ratchet plate within the handle 12.

The ratchet plate includes a tongue 30 which defines a spring seat 32 for receiving a handle biasing spring 34. The spring seat 32 includes a prong 32a for locating the upper end of the spring 34. The other end of the spring 34 is received by a spring seat 38 defined by the upper handle member. In the preferred embodiment, the spring seat 38 includes a locating prong 38a both of which are integrally formed in the handle 12. The ratchet plate 24 also includes a slot-like aperture 40 defined by a substantially rectilinear edge 40a and a series of adjacent ratchet teeth 41, 42, 43.

The cutter 16 includes a knife edge 16a located to the left of the pivot assembly 18. An aperture 45 is formed near the right end of the cutter blade (as viewed in FIG. 1). A ratchet linkage or lever 50 is pivotally connected to the cutter blade 16 by a pivot pin 52 that extends through the aperture 45 in the cutter blade 16 and a similarly formed aperture 53 (shown in FIG. 3) in the ratchet linkage 50.

The linkage 50 preferably comprises a pair of parallel link plates 50a, 50b. As seen in FIGS. 3-5, the linkage plates are disposed on either side of the cutting blade 16 and the ratchet plate 24. As seen in FIG. 1, a pawl 54 is captured between the link plates 50a, 50b and rides within the slot 40 formed in the ratchet plate 24. In the preferred method of assembly, the pawl 54 is mounted by a "spring pin" 51 which is press fitted through apertures formed at the lower end of each link plate 50a, 50b and an aperture formed in the pawl. In an alternate embodiment, the pawl 54 is eliminated as a separate element and instead, the spring pin 51 may serve as the pawl. The frictional engagement between the roll pin and the link plates maintains the assembled positions of the lower ends of the links 50a, 50b.

Referring to FIG. 3, each ratchet link includes an extension 56 defining an aperture 57. In the preferred embodiment, another spring pin 58 or other suitable friction pin is press fitted through the apertures and serves to maintain the assembled position of the upper ends of the ratchet links 50a, 50b. Once assembled, the ratchet links 50a, 50b act as a unitary lever and relative movement between the links is inhibited by the press fitted spring pins 51, 58. It should be understood that other types of pins or for that matter other types of fasteners may be employed to join the links 50a, 50b in the required spaced, parallel configuration shown.

A cutter reset linkage, indicated generally by the reference character 60, extends between the ratchet linkage 50 and the lower handle member 12. In particular, the reset linkage 60 includes a first link member 62 pivotally connected to a second link member 64 by a pivot pin 66. The first link member 62 is pivotally connected to the extension 56 of the ratchet linkage 50 by the pivot pin 58. The second link member 64 extends from the pivot pin 66 to the lower handle 12 and is pivotally interconnected by a pin 70.

The right end (as viewed in FIG. 3) of the link 62 defines a transverse tab 62a and a notch 62b. The tab 62a prevents the links 62, 64 from pivoting overcenter with respect to the position shown in FIG. 1. When the handles 10, 12 are squeezed, the links 62 pivot in a counter-clockwise direction with respect to the link 64. Then the handles 10, 12 are pulled apart, the links 62 rotates in a clockwise direction until the links 62, 64 are longitudinally aligned. The transverse tab 62a prevents the links 62 from rotating in a clockwise direction when the handles are again squeezed.

The notch 62b cooperates with a resilent lock wire 68 pivotally connected to the handle member 12 by the pin 70. When the handles 10, 12 are squeezed, the lock wire 68 can be rotated counter-clockwise until its extreme end 68a engages the notch 62b. The engagement locks the handles 10, 12 in the squeezed position. The engagement is released by simply squeezing the handles 10, 12 to cause the lock wire 68 to be disengaged.

A torsional spring 72 (shown only in FIG. 1) applies a biasing force to the ratchet linkage 50 such that the ratchet pawl 54, in normal operation, is continually biased towards one of the ratchet teeth 41, 42, 43. In particular, the torsional spring 72 includes a first leg 72a captured in a relatively small aperture 74 formed in the cutter blade and a second leg 72b which engages the pivot pin 58. The legs 72a, 72b are biased inwardly i.e. towards each other, such that the ratchet linkage 50 is urged to rotate, counterclockwise about the pivot 52, by the torsional spring 72. According to a feature of the invention, the handle 10 includes an integrally molded recess 80 for receiving the spring 72 when the handles are squeezed together.

The cutter tool operates as follows: the handles 10, 12 are initially pulled apart by the operator. The spreading of the handles 10, 12 causes the linkage members 62, 64 to become longitudinally aligned and placed in tension. The tension force is applied to the pivot 58 of the ratchet linkage 50, causing the link to rotate clockwise about the pivot 52. This action causes the pawl 54 and the ratchet linkage 50 to disengage the ratchet tooth side of the aperture 40 and to travel along the rectilinear edge 40a, downwardly to the lowest point in, or base of, the aperture 40 (as shown in FIG. 1). When the handles 10, 12 are released, the torsional spring 72 again biases the ratchet pawl 54 towards the ratchet teeth of the aperture 40.

The tube or other article to be cut is then placed in the jaw 20 intermediate the jaw surfaces 20a, 20b, 20c and the cutter 16. The handle members 10, 12 are then squeezed. For purposes of explanation, assume that the upper handle member 10 remains fixed and only the lower member 12 moves, toward the upper handle member. As the handle member 12 moves upwardly, the ratchet linkage 50 is also driven upwardly, imparting a counterclockwise rotation to the cutter blade 16. The knife edge 16a is thus driven downwardly into the tube T. The force applied by the operator to the handle 12 is multiplied by the compound linkage defined between the pivot 14 and the pawl 54 and between the cutter pivot 18 and the ratchet linkage pivot 52. In normal operation, moving the handle 12 from the fully spread position to the fully squeezed position produces an incremental motion in the cutter 16, which partially cuts through the tube T.

The handles are then allowed to spring apart by the action of the biasing spring 34. As the handle 12 moves downwardly, the cutter blade 16 remains stationary and the ratchet pawl 54 in the ratchet plate 24 rises with respect to the aperture 40. Since the pawl is biased towards the ratchet teeth, the pawl 56 will drop into the first ratchet tooth 41. The handles are then again squeezed so that the handle 12 is moved upwardly towards the handle 12. As a result, the cutter 16 is again moved an incremental distance to further cut the tube T. The handle release and squeeze cycles are repeated until the cutter 16 is driven to its full downward position (as viewed in FIG. 1), at which point, the tube T is fully severed.

It should be apparent, that during the final incremental cut of the cutter 16, the ratchet pawl 54 is located in the upper most ratchet tooth 43 of the ratchet plate. When a cutting sequence is to be reinitiated, the handles 10, 12 are spread apart to cause the reset linkage 60 to bias the ratchet link 50 in the clockwise direction to enable the ratchet pawl 54 to again drop to the lowest position in the aperture 40.

It has been found that high blade forces are encountered at the beginning of the cutting cycle as the blade cuts through the wall of the tube and near the end of the cutting cycle as the blade again cuts through the tube wall. In the disclosed embodiment, the ratchet teeth and ratchet lever are arranged such that the mechanical advantage obtained at any given ratchet tooth location increases as the handles are squeezed. In addition, the ratchet teeth and lever are sized and located such that the operating handles are partially squeezed as opposed to fully spread apart position, when the blade is at a point in travel at which high blade forces are required. As a result, sufficient mechanical advantage is provided to the operator so that excessive input forces not required in order to actuate the cutting blade at the points in travel at which high forces are generated. Unlike some of the prior art tools, the mechanical advantage changes as the handles are squeezed and as the ratchet lever indexes along the ratchet teeth. High mechanical advantages are provide at those blade positions requiring a high blade force.

According to a feature of the invention, the cutting blade 16 is easily removed for sharpening or replacement. Unlike some prior art cutters, the blade 16 is relatively simple in construction and therefore inexpensive. As indicated above, the blade 16 is pivotally mounted on the handle member 12 by the pivot assembly 18. Referring in particular to FIG. 2, in the preferred embodiment, the pivot assembly 18 comprises a pair of threadedly interconnected members 80, 82. The member 80 includes a threaded shank 80a and an enlarged head 80b. In one embodiment, the member 80 may comprise a standard threaded fastener such as a machine screw. The member 82 includes a uniform diameter shank 82a and an enlarged head 82b. The shank 82a defines a centrally positioned, threaded bore adapted to receive the shank 80a of the member 80. The shank 82a of the member 82 is sized to be pivotally received by the aperture 17 formed in the cutting blade 16 and defines a pivot surface therefore. The head 82b of the member 82 may define an implement receiving recess 86 for engaging a screw driver or other tool. The pivot assembly 18 is disassembled by simply unscrewing and separating the members 80, 82 thereby releasing the blade 16 from its pivot connection. The leg 72a of the torsion spring 72 is then disengaged from the aperture 74 formed in the blade.

The final step in the disassembly is the disengagement of the right end of the blade (as viewed in FIG. 1) from the ratchet linkage 50. Turning to FIGS. 4 and 5, the pivotal connection between the right end of the blade 16 and the ratchet linkage 50 is provided by a pin 90 which extends through the apertures 53 in each link plate 50a, 50b and through the aperture 45 formed in the blade (shown in FIG. 1 only). The pin 90 is maintained in its installed position by a spring ring 96 which is carried in a groove (not shown) formed in the pin 90. The groove is sized to completely receive the spring ring 96 when the ring is circumferentially compressed. In the normal uncompressed state, the spring ring 96 is selected such that it defines a diameter greater than the diameter of the apertures 53 formed in the links 50a, 50b to install the pin 90 (with the spring ring 96 carried in the groove), the end of pin is pushed through the apertures 53 and 45. By applying a suitable force to the pin, the spring ring will be forced to compress into the pin groove allowing it to move past the link plate 50a, whereas it will re-expand to inhibit futher movement in the pin 90.

In order to release the connection between the ratchet linkage 50 and the blade 16, a suitable axial force is applied to the pin 90 to cause the spring ring 96 to compress into the groove so that it can move past the link plate 50a, allowing the pin 90 to be completely removed. The spring ring 96 and pin are selected so that the force needed to either remove or install the pin 90 is not excessive but which is greater than any axial forces that might be applied to the pin 90 during normal use. With the blade 16 completely disengaged, it can be removed from the tool through the slot 15 formed in the upper handle member 10. With the disclosed construction, the tool itself and in particular the handle members 10, 12 do not have to be separated.

Installation of a replacement blade or a resharpened blade is easily achieved by reversing the above described process.

According to a feature of the invention, the pivot assembly 18 by which the blade is pivotally mounted within the tool, also serves an additional function. As seen in FIG. 2, the pivot members 80, 82 extend through apertures formed in circular bosses 100 that are integrally molded with the narrow dimension sidewall sections 13a. When the members 80, 82 are threadedly engaged and tightened, clamping pressure is applied to the sidewall portions 13a urging them towards each other. As seen in FIG. 2, the cutting blade 16 extends through the slot 15 and portions of the blade thus extend between inside surfaces of the sidewall section 13a. By suitably tightening the members 80, 82 a frictional engagement or "drag" can be applied to the sides of the blade 16 by the inside surfaces of the sidewall sections. This drag inhibits movement in the cutting blade 16 when the handles 10, 12 are released.

As explained above, during a cutting cycle the blade remains stationary after each incremental cut to enable the ratchet pawl 54 to rise upwardly in the slot 40 to engage the next higher tooth. For most operations, the tube being cut will provide sufficient frictional engagement with the blade to prevent movement when the handles are released. However, with the disclosed pivot construction an additional drag force can be applied to the blade to insure that it remains stationary during release of the handles. In addition, with the disclosed construction of the members 80, 82 the frictional force can be easily adjusted by the operator when the blade is installed and more importantly can be readjusted to compensate for wear during the life of a tool.

The disclosed cutter thus provides an efficient and inexpensive tool for severing synthetic resin tubes. Although the tool is relatively maintenance free, the primary wear component, namely the cutter 16, can be easily replaced by the user, adding to the useful life of the tool. Moreover it has been found that a tool constructed in accordance with the invention utilizing the disclosed ratchet plate and ratchet linkage, provides sufficient mechanical advantage so that cutting through a one inch soft PVC tube requires no more than 50 pounds of input force by the operator at any point of travel in the cutting blade. For test purposes the input force was measured on the second member 12 at 4.125" from the handle pivot 14.

Although the invention has been described with a certain degree of particularity, it should be understood that those skilled in the art can make various changes to it without departing from the spirit or scope of the invention as hereinafter claimed.

I claim:

1. A tool for cutting a synthetic resin tube, comprising:
    (a) a first handle member defining a fixed jaw for at least partially supporting a tube to be cut;
    (b) a second handle member pivotally connected to said first handle member;
    (c) a ratchet plate carried by said second handle member and defining a peripheral edge that closely conforms to structure defined by said second handle member such that cooperation between said peripheral edge and said structure and between said ratchet plate and a pivot pin extending through said handle members and said plate serves to rigidly mount said ratchet plate to said second handle member such that said ratchet plate and said second handle form a substantially unitary structure;
    (d) said ratchet plate including a spring seat for receiving spring forces from a spring extending between said seat and structure formed on said first handle member such that said spring applies a force to said handle members urging them apart;
    (e) said ratchet plate defining a plurality of ratchet teeth and a substantially uninterrupted guide surface opposite said ratchet teeth;

(f) a cutting blade mounted for pivotal movement to said first handle member and including a cutting portion movable towards and away from said fixed jaw defined by said first handle member;

(g) an actuating link for driving said cutting blade including means pivotally connecting said link to said blade, said link including a ratchet pawl engageable with said ratchet plate;

(h) spring means operative to urge said ratchet pawl towards engagement with the ratchet teeth in said ratchet plates, said operating link operative to drive said blade in a cutting direction when said handle members are squeezed;

(i) friction means for maintaining the relative rotative position of said cutting blade with respect to said first handle member when said handle members are released after being squeezed;

(j) cutting blade reset means including a linkage operable when said handle members are pulled apart to cause said cutting blade to be driven to its fully open position.

2. The apparatus of claim 1 wherein said linkage is connected between said second handle member and said actuating link.

3. The apparatus of claim 1 wherein said linkage means includes a handle lock means by which said handle members are retained in a squeezed position during tool nonuse.

4. The tool of claim 1 wherein said means pivotally connecting said actuating link to said cutting blade comprises a pin carrying a spring ring, said pin and spring ring being removable by applying a predetermined axial force to one end of said pin.

5. A tool for cutting plastic tubes comprising:
(a) a first handle member defined by a pair of first sidewalls interconnected by web portions spaced on either side of a pivot structure;
(b) a second handle member pivotally connected to said first handle member, said second handle member defined by second sidewalls interconnected by at least one web portion;
(c) pivot structure including a pivot pin interconnecting said first and second handle members for relative pivoting movement; and
(d) a ratchet plate carried by said second handle member and defining a contoured edge configured to conform to at least a portion of said web portion of said second handle member and further defining an aperture aligned with said handle pivot pin such that said ratchet plate is maintained in its installed position by the co-engagement of said pivot pin with said ratchet plate aperture and said contoured edge with said web portion such that said ratchet plate and said second handle form a substantially unitary structure.

6. The apparatus of claim 5 further comprising:
(a) a cutting blade pivotally supported by said pivot structure;
(b) a slot defined by said first handle member through which said cutting blade extends;
(c) sidewall sections defined by said first handle member frictionally engageable with side portions of said cutting blade; and,
(d) a pivot assembly for pivotally mounting said blade in said first handle member, said assembly operative to apply a clamping force to said sidewall sections to produce a frictional engagement between said side portions of said blade and said sidewall section.

7. The apparatus of claim 6 further comprising:
(a) a ratchet level pivotally connected to said blade and mounting a pawl engageable with one of a plurality of ratchet teeth defined by said ratchet plate;
(b) biasing means urging said ratchet pawl towards engagement with at least one of said ratchet teeth;
(c) reset linkage extending between said ratchet lever and said second handle member;
(d) said reset linkage operative, upon predetermined movement in said handles, to apply a force to said ratchet lever rendering said biasing force ineffective whereby said ratchet pawl is released from said ratchet teeth and is permitted to travel to an initial cutting position in said ratchet plate.

8. A cutting tool for plastic pipe, comprising:
(a) first and second handle members pivotally connected by a pivot assembly;
(b) said first handle member defining a jaw for supporting a tube to be cut and a slot through which a cutting blade extends;
(c) a pivot assembly pivotally mounting said cutting blade to said first handle member;
(d) a ratchet plate carried by said second handle member and defining a series of ratchet teeth and a guide surface spaced from said ratchet teeth;
(e) a ratchet lever including a pawl operatively connecting said cutting blade with said ratchet plate such that relative pivotal motion in said handle members towards each other, produces movement of said cutting blade towards said jaw;
(f) means biasing said pawl towards engagement with said ratchet teeth; and
(g) reset linkage operable upon movement of said handle members to a spread apart position, to overcome said biasing force to cause said ratchet lever to engage said guide surface whereby said pawl is caused to move to an initial position in said ratchet plate at the commencement of a cutting cycle.

9. The apparatus of claim 8 wherein said reset linkage comprises a pair of pivotally connected links one of said links connected to said ratchet lever the other of said links pivotally connected to said second handle member.

10. The tool of claim 9 wherein said one of said links forming part of said reset linkage defines structure engageable by a locking member carried by said second handle member, said locking member operative to engage said structure to lock said handle members in a predetermined squeezed position.

11. The cutting tool of claim 9 wherein said means biasing said ratchet lever comprises a torsion spring including a pair of legs one of which operatively engages said cutting blade, the other of which operatively engages said ratchet lever.

12. A cutting tool for plastic tubes, comprising:
(a) a first handle member including a pair of sidewalls extending between spaced web sections;
(b) said first handle member defining pivot structure by which a cutting blade is pivotally supported, a slot through which a cutting portion of said blade extends, and jaw structure for supporting a tube to be cut;
(c) a second handle member including a pair of sidewalls and a web section interconnecting said sidewalls;

(d) said first and second handle members being pivotally connected by a pivot member extending through apertures formed in the sidewalls of said second handle member;

(e) a ratchet plate carried by said second handle member intermediate said second member sidewalls, said ratchet plate defining an aperture alignable with the pivot apertures in said second handle member and further defining a mounting edge abutably engageable with an abutment wall forming part of said second handle member such that engagement between said pivot member and said ratchet plate and the engagement between said abutment wall and said ratchet plate edge serve to rigidly secure said ratchet plate to said second handle member;

(f) said ratchet plate further defining a slot-like aperture defining a series of ratchet teeth along one side and a guide surface defined opposite said ratchet teeth;

(g) a pivot assembly pivotally mounting said cutting blade to the pivot structure of said first handle member;

(h) a ratchet lever carrying a ratchet pawl near one end, said pawl engageable with said slot-like aperture in said ratchet plate, the other end of said ratchet lever pivotally connected to said cutting blade a predetermined distance from said cutting blade pivot assembly;

(i) a cutter reset linkage, one end of said linkage operatively connected to said ratchet lever, the other end of said linkage operatively connected to said second handle member;

(j) spring means acting between said blade and said ratchet lever and operative to urge said ratchet lever pawl towards engagement with at least one of said ratchet teeth;

(k) said reset linkage operative upon predetermined movement of said operating handles, to counter said spring means and urge said pawl towards said guide surface whereby said pawl is permitted to move to an initial cutting position;

(l) a pivot pin including a resilient retaining means interconnecting said cutting blade and said ratchet lever, said retaining means allowing said pin to be removed by the application of a predetermined axial force to one end of said pin; and (m) said pivot assembly including clamping means for exerting clamping pressure to regions of said first handle member side walls whereby said side wall regions are urged towards each other to provide a drag force on said cutting blade.

13. The cutting tool of claim 12 further comprising a handle lock means including a resilent lock wire pivotally connected to said handle member having one end engageable with structure on said reset linkage, said lock wire operative to maintain said handles in a predetermined squeezed position when said lock wire is engaged by said structure on said reset linkage.

14. The cutting tool of claim 12 wherein said cutter reset linkage includes a pair of pivotally interconnected links one of said links defining the one end connected to said ratchet lever the other of said links defining the other end operatively connected to said second handle member, one of said links further including a stop means for preventing said links from moving over center when said operating handles are moved to a spread apart position.

15. A cutting tool for plastic tubes, comprising:
(a) first and second handle members pivotally connected by a pivot assembly;
(b) said first handle member defining a jaw for supporting a tube to be cut and a slot through which a cutting blade extends;
(c) a pivot assembly pivotally mounting said cutting blade to said first handle member;
(d) a ratchet means operated by said second handle member and defining a series of ratchet teeth and a guide surface spaced from said ratchet teeth forming part of said second handle member;
(e) a ratchet lever including a pawl operatively connecting said cutting blade with said ratchet means such that relative pivotal motion in said handle members towards each other, produces movement of said cutting blade towards said jaw;
(f) means biasing said pawl towards engagement with said ratchet teeth; and
(g) reset linkage operable upon movement of said handle members to a spread apart position, to overcome said biasing force to cause said ratchet lever to engage said guide surface whereby said pawl is caused to move to an initial position in said ratchet means at the commencement of a cutting cycle.

16. The apparatus of claim 15 wherein said ratchet means comprises a ratchet plate carried by said second handle member, said ratchet plate including an edge surface abutably engaging an abutment wall forming part of said second handle member.

17. The apparatus of claim 15 wherein said ratchet means and said ratchet lever are arranged to provide an increasing mechanical advantage as said handles are moved from a spread apart position to a squeezed position, said mechanical advantage varying from a predetermined minimum value to a maximum value, said ratchet lever and ratchet means being further selected such that at positions of cutting blade travel where high blade forces are encountered, said ratchet lever and ratchet means provide a mechanical advantage nearer said maximum value than said minimum value.

18. The apparatus of claim 17 wherein said ratchet lever and ratchet means are selected such that said cutting blade is driven through cutting positions at which high blade forces are encountered when said handles are in a partially squeezed position.

* * * * *